United States Patent [19]

Held et al.

[11] 4,021,057

[45] May 3, 1977

[54] SAFETY ARRANGEMENT FOR PASSENGERS OF A VEHICLE

[75] Inventors: Manfred Held, Aresing; Johann Spies, Pfaffenhofen, both of Germany

[73] Assignee: Messerschmitt-Bolkow-Blohm GmbH, Munich, Germany

[22] Filed: Oct. 14, 1975

[21] Appl. No.: 621,765

[30] Foreign Application Priority Data

Oct. 23, 1974 Germany .................... 2450235

[52] U.S. Cl. .................... 280/735; 180/103 R
[51] Int. Cl.² .................... B60R 21/08
[58] Field of Search .......... 280/735, 736, 737, 741, 280/742; 180/103, 91

[56] References Cited
UNITED STATES PATENTS

| | | |
|---|---|---|
| 3,701,903 | 10/1972 | Merhar .................... 280/735 |
| 3,758,131 | 9/1973 | Stephenson .................... 280/735 |
| 3,762,495 | 10/1973 | Usui et al. .................... 280/735 X |
| 3,874,695 | 4/1975 | Abe et al. .................... 280/735 |
| 3,911,391 | 10/1975 | Held et al. .................... 280/735 |

*Primary Examiner*—Kenneth H. Betts
*Attorney, Agent, or Firm*—Toren, McGeady and Stanger

[57] ABSTRACT

A safety arrangement for passengers of a moving vehicle includes an inflatable air cushion for maintaining passengers in their seat positions and a plurality of gas generators for inflating the cushion. The cushion is inflatable at different rates depending on vehicle deceleration by the employment of an electrical release circuit. The circuit includes a piezoelectric sensor for providing a signal representative of deceleration, a first threshold value switch, an integrator, a plurality of threshold value switches having different thresholds and a plurality of firing elements for the gas generators.

6 Claims, 4 Drawing Figures

SAFETY ARRANGEMENT FOR PASSENGERS OF A VEHICLE

FIELD OF THE INVENTION

The present invention relates to a safety arrangement for passengers of a moving vehicle who, in the event of a crash or rapid decleration, are maintained in their seating positions by means of an air pillow or cushion inflatable by gas generators.

BACKGROUND OF THE INVENTION

From the German Offenlegungsschrift No. 2 339 048, a safety device is known where an air pillow or cushion is inflated in the event of an accident or crash of low impact force by a single gas generator. However, in the event of a serious accident, the air pillow or cushion is inflated by a plurality of simultaneously fired gas generators in a sudden burst. The purpose of this approach is to avoid subjecting passengers to very rapidly inflating cushions when a crash or accident of minor consequence occurs.

From the German Offenlegungsschrift No. 2 224 201, it is also known to inflate the air cushion or pillow intermittently. In such an arrangement, fuel chambers disposed in a generator housing and containing at least two propellant charges have respective gas discharge outlets communicating with the air cushion or pillow. Propellant charges of the individual fuel chambers are fired successively and prior to the propellant cut-off of the respective fuel chamber supplying gas to the air pillow or cushion. The total quantity of the gas expelled from the generator corresponds to the required quantity for filling the air cushion. It has been ascertaned that during such intermittent inflations of the air cushion, the latter is securely protected from any excessive mechanical and thermal loads. Further, the sounds accompanying the inflation process in the interior of the vehicle can be significantly reduced. By this approach, secondary injuries or damage to the passengers of the vehicle can be avoided, such as injuries to the ear drum.

OBJECTS OF THE INVENTION

It is accordingly an object of the present invention to combine the advantages of the aforementioned inflation methods, that is, to inflate the air cushion intermittently and at a rate dependent on the force of impact of the vehicle.

It is also an object of the present invention to provide a safety arrangement for passengers of a moving vehicle where the protective pillow or cushion is inflated at a rate determined by the deceleration of the vehicle so that the possibility of injury to the passengers by the protective device is minimized.

SUMMARY OF THE INVENTION

In accordance with the present invention, a safety arrangement for passengers in a moving vehicle comprises an inflatable air cushion for maintaining passengers in their seat positions and a plurality of gas generators for inflating the cushion. An electrical release circuit controls the operation of the gas generators and includes receiver means mounted on the vehicle for providing an electrical signal representative of the deceleration of the vehicle, an integrator responsive to the deceleration representative electrical signal and a plurality of threshold value switches responsive to the integrator output having different respective threshold values. A plurality of firing elements for the gas generators is coupled to the threshold value switches. Each firing element is responsive to a different threshold value switch. The arrangement enables the cushion to be inflated at a rate corresponding to the amount of vehicle deceleration. In one form of the invention, the integrator is preceded by an additional threshold value switch.

For a better understanding of the present invention, reference is made to the following description and accompanying drawings, while the scope of the invention will be pointed out in the appended claims.

DETAILED DESCRIPTION OF THE INVENTION

Figure 1:
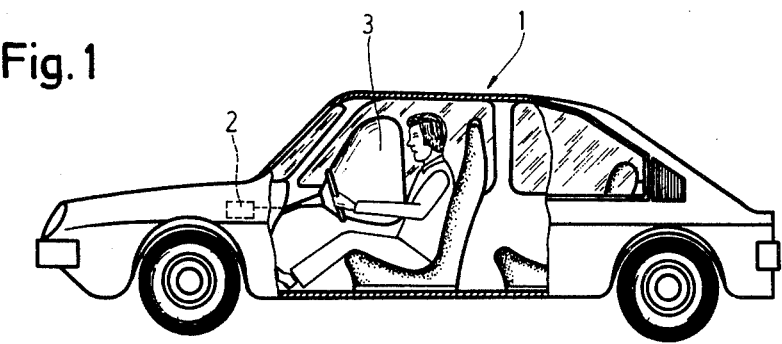
FIG. 1 illustrates in side view, partially broken away and partially schematic, a safety arrangement in accordance with the present invention.

Referring initially to FIG. 1, a safety arrangement is installed in a vehicle 1 which includes a release circuit 2 and an air cushion or pillow 3. In the event of an accident or crash, the release circuit furnishes a signal if the decleration of the vehicle exceeds a predetermined amount, so that, by means of this signal, the air cushion 3 is quickly caused to be inflated. Passengers within the vehicle are rapidly pressed against the air cushion 3, so that their bodies are cushioned and cannot impact with hard portions of the front of the vehicle as shown in FIG. 1.

Figure 2:
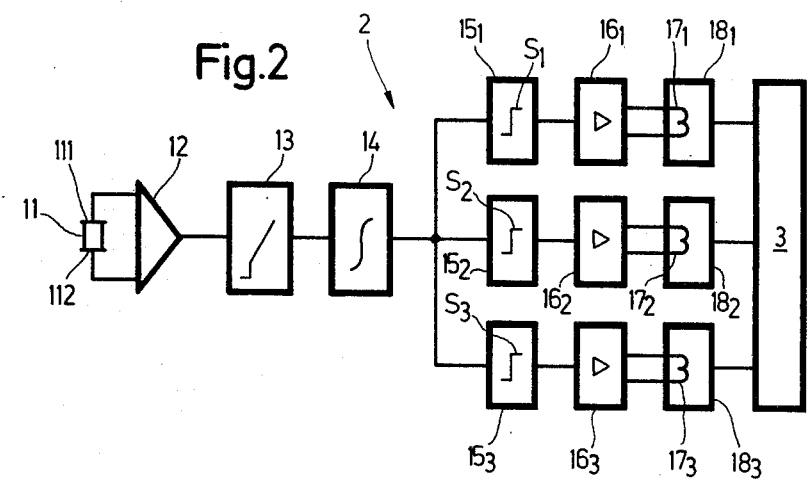
FIG. 2 is a block diagram of the electrical portion of applicants' invention shown in FIG. 1.

Referring now to FIG. 2, the release circuit is shown there as element 2. The release circuit includes receiver means mounted on the vehicle for providing an electrical analog signal representative of deceleration of the vehicle shown, for example, as piezoelectric receiver 11. The piezoelectric receiver 11 is disposed with its acceleration-sensitive axis in the longitudinal direction of the vehicle 1. The piezoelectric receiver includes a pair of electrodes 111 and 112. Normally electrode 111 is connected to the vehicle and electrode 112 is connected to a non-illustrated mass subjected to the decelerations of the vehicle.

In the event of deceleration of the vehicle, a voltage is obtained across the electrodes 111 and 112 of the piezoelectric sensor 11. This voltage is an analog voltage which is coupled to an amplifier 12 preferably having a high input impedance. The output of the amplifier 12 provides a signal approximately proportional to the prevailing deceleration of the vehicle. This signal is coupled to a threshold value switch 13 for passing signals above a predetermined level. Threshold value switch 13 may, for example, be a biased linear amplifier. Referring again to the threshold value switch 13, a value of the output signal of the amplifier 12 which is below a certain value is cut off. Such a value corresponds approximately to the value of decleration which can be absorbed by the passengers of a vehicle without any danger. The output of the threshold value switch 13 is coupled to an integrator 14. The integrator provides a signal which is proportional to the integral of the deceleration of the vehicle 1, less the threshold value of the threshold value switch 13.

The output of the signal from the integrator 14 is then supplied to a plurality of parallel-connected threshold value switches. In the case shown, there are these threshold value switches $15_1$, $15_2$ and $15_3$. The switches have respective threshold values designated as $S_1$, $S_2$, and $S_3$. In this respect, reference is also made to FIGS. 3a and 3b where the effective threshold values $S_1$, $S_2$ and $S_3$ are shown. It is assumed here that $S_1$ is the lowest of the values, $S_2$ is larger than $S_1$ and $S_3$ is largest. The differences between the individual threshold levels can be equal or can be made to differ.

The output signals of the individual threshold value switches 15 are supplied to respective amplifiers $16_1$, $16_2$ and $16_3$. These amplifiers in turn drive and activate firing elements $17_1$, $17_2$ and $17_3$, which, in turn, fire respective gas generators $18_1$, $18_2$ and $18_3$.

Figure 3A:
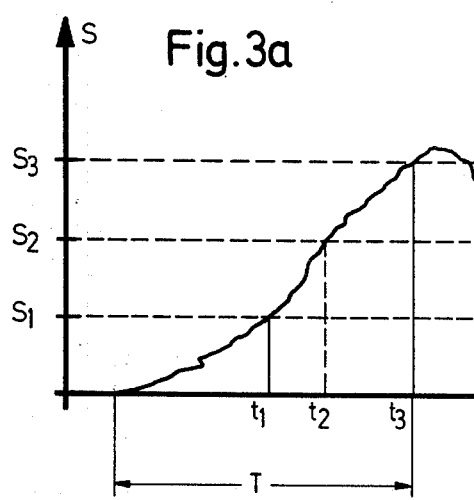
FIGS. 3a and 3b illustrates in graphical representation respective timing diagrams for release of the safety arrangement.
Figure 3B:
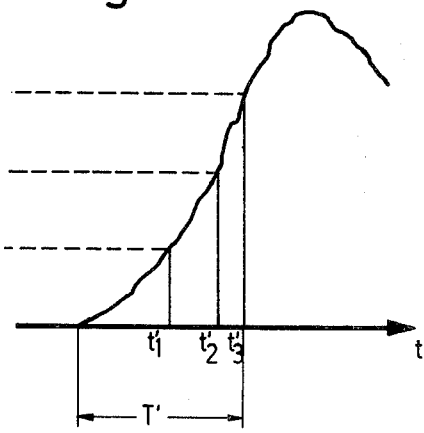

If the deceleration of the vehicle 1 occurring during a crash is only moderate, for example, see FIG. 3a, then, although the three gas generators $18_1$, $18_2$ and $18_3$ are successively fired one after another, the total time T required for firing of the three generators is considerably longer than the deceleration time occurring during a severe crash. In this respect see the graph shown in FIG. 3b and compare the time T' to the time T in FIG. 3a. Further, the individual firing time occurrences of the respective gas generators, $t_1$, $t_2$ and $t_3$ in a moderate crash (see FIG. 3a) and those times $t_1'$, $t_2'$ and $t_3'$, for a severe crash (again see FIG. 3b) — are dependent on the respective decelerations of the vehicle.

It will, of course, be understood that only a single gas generator having separate fuel chambers with a plurality of propellant charges can be used for the inflation of the air cushion in lieu of the three gas generators referred to above.

The release circuit, in its basic form, is known per se from the German Offenlegungsschrift No. 2 207 831. The present invention employs such a release circuit so that the passengers of a vehicle are cushioned in dependence on the relative impact velocity and, in the event of a relatively low impact velocity are cushioned at a corresponding lower stress due to the safety device. Again, the present invention employs a piezoelectric crystal as a receiver which provides an output signal at the output of the integrator which corresponds to the integral of the deceleration occurring during an accident or crash, less a defined threshold value. The output signal therefore increases more or less rapidly in dependence on the relative impact velocity of the vehicle. It is apparent that the individual gas generators are successively fired in this manner either slowly or rapidly, i.e., intermittently, and the air cushion is consequently inflated according to the relative impact velocity more rapidly or less rapidly. The passengers of the vehicle are therefore cushioned in a timely fashion during each crash by the safety device without being unduly stressed thereby.

The individual threshold values of the respective threshold value switches can then be selected so that the number of the released gas generators increases as the severity of the accident increases. That is, either all gas generators are released only during severe accidents or crashes or that all gas generators are released an average amount during each crash. The quantities released by gas generators must, of course, be appropriately selected. The respective amounts of the threshold values are further tailored to the structure of the vehicle and to the construction of the safety device, particularly of the passenger restraining system. The number and design of the gas generators can be such that in all accidents or crashes the propellant charge of the respective next generator is fired prior to the propellant cut-off of the previously released gas generator.

While various embodiments of the present invention have been described and illustrated above, it is intended that all variations and modifications which would be obvious to an individual of ordinary skill in the art, be encompassed by the true spirit and scope of the present invention.

What is claimed is:

1. A safety arrangement for passengers in a moving vehicle comprising:
  an inflatable air cushion for maintaining passengers in their seat positions;
  a plurality of gas generators for inflating said cushion;
  piezoelectric sensor means mounted on said vehicle for providing an electrical analog signal representative of deceleration of the vehicle;
  an integrator responsive to said deceleration-representative electrical signal;
  a plurality of threshold value electrical switches responsive to the integration output having different respective threshold values; and
  a plurality of firing elements for said generators, each element responsive to a different threshold value switch and each being coupled to a respective gas generator; whereby said cushion will be inflated at a rate corresponding to the amount of vehicle deceleration.

2. The arrangement of claim 1 also including an additional threshold element between said sensor means and said integrator.

3. The arrangement of claim 2 wherein said additional threshold element is a biased linear amplifier.

4. The arrangement of claim 1 including at least three threshold value switches wherein the respective differences between the threshold values of said threshold value switches are equal to each other.

5. The arrangement of claim 1 including at least three threshold value switches wherein the respective differences between the threshold values of said threshold value switches are different from each other.

6. The arrangement of claim 1 wherein said threshold value switches are in parallel with each other.

* * * * *